Patented Nov. 23, 1943

2,334,871

UNITED STATES PATENT OFFICE 2,334,871

PROCESS FOR THE PRODUCTION OF HYDROCARBONS FROM CARBONACEOUS MATERIALS, ESPECIALLY BY CRACKING HYDROCARBON OILS

Gerhard Free and Wilhelm v. Fuener, Ludwigshafen-on-the-Rhine, Germany; vested in the Alien Property Custodian No Drawing. Application August 5, 1939, Serial No. 288,582. In France August 8, 1938

10 Claims. (Cl. 196—52)

The present invention relates to a process for the production of hydrocarbons from carbonaceous substances, in particular for the catalytic cracking of hydrocarbon oils.

We have found that in the production of hydrocarbons from carbonaceous substances, in particular in the cracking of hydrocarbon oils, it is advantageous to use a catalyst containing silicic acid, obtained from a silica sol, and at least one compound of a polyvalent metal, in the preparation of which the sol from which the hydrogel is formed has a hydrogen ion concentration lying between pH=4 and 7, preferably between pH=4 and 6.5, during the formation of the hydrogel. Especially good catalytic actions are obtained when the sol has a pH value between 4 and 6, especially between 4.5 and 5.5. In the preparation of the catalyst, the liquid from which the gel is formed must have the said hydrogen ion concentration throughout the whole duration of the gel formation.

The catalyst may for example be prepared as follows:

A waterglass solution is converted by the addition of electrolytes into a sol with the necessary hydrogen ion concentration and then mixed with a solution of salt or with solutions of two or more salts of metals of the 2nd to the 8th groups of the periodic system. There may be mentioned for example the salts of the following metals: alkaline earth metals, aluminum, magnesium, zinc, tin, lead, titanium, molybdenum, tungsten, chromium, venadium, iron, cobalt or nickel. If no satisfactory precipitation takes place, there may be simultaneously or subsequently added to the sol, advantageously before the completion of the gel formation, an alkaline or neutral precipitant, as for example caustic alkali solutions or sodium or ammonium acetate solutions, more preferably a solution of ammonia, ammonium carbonate or ammonium sulphide. The added substances should however be used only in such amounts that the pH value of the mixture remains between 4 and 7. The precipitant may also be added to the sol before the addition of the metal salt solution and the latter mixed for example with the water-containing gel. The mixture is then heated in order to remove the moisture wholly or for the most part. For example the mixture may be evaporated to dryness and heated for example to temperatures between 300° to 800° C.

The mixture of water-containing gel and metal compound may also be evaporated at about 100° C., filtered before drying, the residue washed for the removal of the salts causing the preparation of the gel, then dried and heated to from 300° to 800° C.

The catalyst may also be prepared by bringing the waterglass solution together with the metal salt solution without the formation of gel having first occurred. This is effected by ensuring that the mixture contains sufficient acid in excess. For example there may be added to an alkaline or acid silicate solution an acid or neutral solution of salts, as for example of aluminum and/or iron, as for example the nitrates, sulphates or chlorides of these metals, the solutions being so adjusted to each other that an excess of acid is present after mixing. It is advisable to allow the alkaline or neutral solution to flow into the acid solution. After standing for a long time the sol solidifies with the formation of the gel. The formation of the gel may be accelerated by heating the solution. The gel is then washed free from acid to a great extent and heated to high temperatures.

During washing it is advantageous to impart to the washing water at the start the same hydrogen ion concentration as that of the liquid from which the gel has been formed.

It is not essential to add the metal compound during the preparation of the silica gel, but it may also be incorporated with the finished gel, for example by impregnating the latter with a metal salt solution.

The proportion of gel in the catalyst should preferably amount to from 30 to 75 per cent. If the catalyst contains, apart from other metal components, $SiO_2$ and $Al_2O_3$, the ratio of $SiO_2:Al_2O_3$ should preferably be less than about 75:25.

The catalyst may also be shaped with carbonaceous substances, such as graphite, and then exposed to high temperatures, as for example from 500° to 800° C.

A small amount of boric acid, as for example from 0.2 to 10 per cent, may also be incorporated with the catalyst during its preparation, as for example before, during or after the heating.

In many cases it is also desirable to dissolve out again from the catalyst part of the introduced metal compounds, as for example with inorganic or organic acids. The dissolving out of the metal compounds may be carried out already while the mass is still moist, i. e., before a strong heating has taken place. The resulting product is then washed out well, dried and heated.

The catalyst is eminently suitable for the cracking of mineral oils, tars, destructive hydrogenation products of coals, tars and mineral oils, extraction products of coals, cracking products of hydrocarbon oils, oils consisting mainly of hydrocarbons prepared from carbon monoxide and hydrogen, or fractions of these substances. The cracking is carried out at atmospheric or increased pressure, as for example at from 10 to 200 atmospheres, preferably with increasing pressure, and at temperatures of from 300° to 700° C., preferably with increasing temperature.

The catalyst is also suitable for the destructive hydrogenation of coals, tars and mineral oils at pressures above 100 atmospheres, preferably above 250 atmospheres, as for example at from 300 to 700 atmospheres, and especially in the treatment of hydrocarbon oils in the gas phase. It is of advantage, when using a catalyst which still contains aluminum and/or magnesium in addition to silicon, to operate at a pressure above 400 atmospheres. If on the other hand a metal compound having a marked hydrogenation effect be deposited on the catalyst, then pressures of less than 400 atmospheres may be employed. The catalyst is also very suitable for other reactions with carbonaceous substances which lead to valuable hydrocarbon oils, as for example the polymerization (at temperatures of from 100° to 250° C.), isomerization (at temperatures of from 350° to 500° C.), alkylation (at temperatures of from 180° to 380° C.), refining, as for example the desulphurization (at temperatures of from 200° to 530° C.) or dehydrogenation of hydrocarbons (at temperatures of 300° to 700° C.).

In destructive hydrogenations it is especially advantageous to provide a catalyst, for example containing aluminum and/or magnesium, with one or more heavy metal compounds, in particular sulphides, as for example molybdenum sulphide, tungsten sulphide, nickel sulphide and/or iron sulphide.

The following examples will further illustrate how the said invention may be carried out in practice but the invention is not restricted to these examples.

*Example 1*

650 grams of a waterglass solution containing 26 per cent of $SiO_2$ are diluted with water to 3 liters and acidified with 160 cubic centimeters of concentrated hydrochloric acid. This solution is adjusted to a pH value of from 5.5 to 6.0 by the addition of ammonia, stirred and there is then added, while continuously stirring, a solution of 680 grams of aluminum nitrate $(AlNO_3)_3 \cdot 9H_2O$ in 2 liters of water. The acid thus set free is continuously neutralized with such an amount of ammonia that the pH of from 5.5 to 6.0 is maintained during the precipitation. The precipitate is filtered, washed first with acidified water (pH=5.5 to 6.0) and then with pure water, dried and heated to from 450° to 500° C.

By leading a paraffin base petroleum over this catalyst at 460° C., a product is obtained containing 38 per cent of benzine boiling up to 200° C.

*Example 2*

650 grams of waterglass solution containing 26 per cent of $SiO_2$ are diluted with water to 3 liters and acidified with 160 cubic centimeters of concentrated hydrochloric acid. This solution is adjusted to a pH value of about 5.0 by the addition of ammonia, stirred and, while continuously stirring, there is added thereto a solution of 687 grams of aluminum nitrate $(Al(NO_3)_3 \cdot 9H_2O)$ and 30 grams of iron chloride $(FeCl_3 \cdot 6H_2O)$ in 2 liters of water. The acid thus set free is continuously neutralized with such an amount of ammonia that the pH of about 5.0 is maintained during the precipitation. The precipitate is filtered off, washed first with acidified water (pH=4.5 to 5.0) and then with pure water, dried, shaped and heated to a temperature of 450° C.

If a paraffin base petroleum middle oil (boiling limits 210° to 360° C.) be led with a throughput of 100 cubic centimeters per hour over 100 cubic centimeters of the catalyst at 460° C., the reaction product contains 35 per cent of constituents boiling up to 200° C.; the waste of initial material amounts to from about 3 to 4 per cent.

*Example 3*

1.3 liters of waterglass solution containing 26 per cent of $SiO_2$ are diluted with 10 liters of water and 430 cubic centimeters of concentrated hydrochloric acid are added. 3.95 kilograms of aluminum nitrate $(Al(NO_3)_3 \cdot 9H_2O)$, 60 grams of iron chloride $(FeCl_3 \cdot 6H_2O)$ and 18 grams of magnesium nitrate $(Mg(NO_3)_2 \cdot 6H_2O)$ dissolved in 10 liters of water are added to this solution. The clear sol thus prepared and a 20 per cent ammonia solution are allowed to flow while stirring vigorously into 3 liters of water which has been adjusted to the desired pH value of 5.5 by the addition of ammonia, the manner in which the sol and the ammonia solution are allowed to flow in being such that in the liquid in which the precipitate is formed the said pH value, measured with an antimony electrode, is maintained. The precipitate is filtered off, washed free from chlorine with water adjusted to a pH value of 5.5 and dried. The resulting catalyst is impregnated with ammonium thiotungstate dissolved in ammonium sulphide solution in such an amount that the finished catalyst contains 10 per cent of tungsten disulphide. The catalyst is then dried, heated at from 400° to 420° C. in a current of hydrogen and shaped.

If a mixed base petroleum middle oil be led over this catalyst at 410° C. and with a hydrogen pressure of 250 atmospheres, a product containing 60 per cent of benzine and having an octane number of 77 is obtained in a 90 per cent yield.

*Example 4*

To a sodium silicate solution having a specific gravity of 1.091 and containing $Na_2O$ and $SiO_2$ in the molecular ratio of 1:3.5 there are added 3.3 grams of sodium hydroxide per liter of silicate solution. A second solution is prepared by dissolving 113.5 grams of aluminum sulphate $(Al_2(SO_4)_3 \cdot 18H_2O)$ per liter and adding 35 grams of $H_2SO_4$ as concentrated acid. 1 liter of the silicate solution is then introduced gradually while stirring vigorously into 820 cubic centimeters of the sulphate solution at room temperature, so that the molecular ratio of $SiO_2:Al_2O_3=10:1$ is obtained. In this way a sol having a pH value of about 5 is obtained.

After about 12 hours the gel has formed. It is comminuted, partially dried at 100° C. and washed with 10 per cent sulphuric acid until no more aluminum salt passes into solution. The residue is then washed free from sulphuric acid. The gel is then shaped and heated to from 400° to 600° C.

If a paraffin base petroleum middle oil (boiling limits 210° to 360° C.) be led over 100 cubic centimeters of this catalyst at 460° C. with a throughput of 100 cubic centimeters per hour, the reaction product contains 38 per cent of benzine having an octane number of 76. The waste amounts to from about 3 to 4 per cent of the initial material.

*Example 5*

A mixture of hydrocarbons obtained by the reduction of carbon monoxide and boiling at from 210° to 330° C. is led in a vaporous state under a pressure of 50 atmospheres and at a temperature of 460° C. over the catalyst described in Example 1, the throughput of initial material being adjusted to 1 kilogram per hour to each liter of catalyst volume.

The result after a single throughput is 40 per cent by weight of benzine with an aniline point of 64° C., an iodine number of 30 and an octane number (motor method) of 70.

*Example 6*

A mixture consisting chiefly of propylene, normal butylene and isobutylene is led over the catalyst described in Example 1 at a rate of 1 kilogram per hour to each liter of catalyst volume. The reaction is carried out at 190° to 210° C. under a pressure of 100 atmospheres, whereby 90 per cent of the olefines are converted into liquid hydrocarbons of which 93.5 per cent consist of fractions boiling up to 200° C. The polymerization commences already at a temperature of 115° C.

*Example 7*

Middle oil containing oxygen (boiling point 220° to 350° C.) prepared by the reduction of carbon monoxide in the presence of a cobalt catalyst is led over the catalyst described in Example 1 at a temperature of 450° C. and at a rate of 0.5 kilogram per hour to each liter of catalyst volume, whereby 50.2 per cent of fractions boiling up to 200° C. are formed. The reaction product is free of oxygen. If, on the other hand, the initial material be led over bleaching earth under the same reaction conditions, only 36.7 per cent of fractions boiling up to 200° C. are formed, which contain 0.4 per cent of oxygen. The higher boiling reaction products possess 0.96 per cent of oxygen.

What we claim is:

1. A process for the production of hydrocarbon oils by catalytic cracking of higher boiling hydrocarbon oils at temperatures of from 300 to 700° C. in the presence of a silica gel-containing catalyst, which comprises using a catalyst obtained from a silicic acid sol and at least one compound of a polyvalent metal, in the preparation of which catalyst a silica hydrogel is formed while the hydrogen ion concentration of the sol is maintained between pH=4 to pH=6.5 throughout the whole duration of the hydrogel formation.

2. A process for the production of hydrocarbon oils by catalytic cracking of higher boiling hydrocarbon oils at temperatures of from 300 to 700° C. in the presence of a silica gel-containing catalyst, which comprises using a catalyst obtained from a silicic acid sol and at least two compounds of at least two different polyvalent metals, in the preparation of which catalyst a silica hydrogel is formed while the hydrogen ion concentration of the sol is maintained between pH=4 to pH=6.5 throughout the whole duration of the hydrogel formation.

3. A process for the production of hydrocarbon oils by catalytic cracking of higher boiling hydrocarbon oils at temperatures of from 300 to 700° C. in the presence of a silica gel-containing catalyst, which comprises using a catalyst obtained from a silicic acid sol and alumina, in the preparation of which catalyst a silica hydrogel is formed while the hydrogen ion concentration of the sol is maintained between pH=4 to pH=6.5 throughout the whole duration of the hydrogel formation.

4. A process for the production of hydrocarbon oils by catalytic cracking of higher boiling hydrocarbon oils at temperatures of from 300 to 700° C. in the presence of a silica gel-containing catalyst, which comprises using a catalyst obtained from a silicic acid sol and magnesia, in the preparation of which catalyst a silica hydrogel is formed while the hydrogen ion concentration of the sol is maintained between pH=4 and pH=6.5 throughout the whole duration of the hydrogel formation.

5. A process as claimed in claim 1 in which during the preparation of the catalyst during the mixing of the silicic acid sol with a solution of the polyvalent metal salt, alkaline reacting precipitants are added in such amounts that a pH value of the mixture of between 4 and 6.5 is maintained during the formation of the hydrogel.

6. A process as claimed in claim 1 in which during the preparation of the catalyst during the mixing of the silicic acid sol with the solution of the polyvalent metal salt, ammoniacal precipitants are added in such amounts that a pH value of the mixture of between 4 and 6.5 is maintained during the formation of the hydrogel.

7. A process as claimed in claim 1 in which during the preparation of the catalyst after the mixing of the silicic acid sol with a solution of the polyvalent metal salt, alkaline reacting precipitants are added in such amounts that a pH value of the mixture of between 4 and 6.5 is maintained during the formation of the hydrogel.

8. A process as claimed in claim 1 in which during the preparation of the catalyst after the mixing of the silicic acid sol with a solution of the polyvalent metal salt, ammoniacal precipitants are added in such amounts that a pH value of the mixture of between 4 and 6.5 is maintained during the formation of the hydrogel.

9. A process as claimed in claim 1 in which during the preparation of the catalyst after the mixing of the silicic acid sol with a solution of the polyvalent metal salt, ammonia is added in such amounts that a pH value of the mixture of between 4 and 6.5 is maintained during the formation of the hydrogel.

10. A process as claimed in claim 1 in which during the preparation of the catalyst at the latest after the beginning but before the completion of the gel formation an ammoniacal precipitant is added in such amounts that a pH value of between 4 and 6.5 is maintained during the formation of the hydrogel.

GERHARD FREE.
WILHELM V. FUENER.